Aug. 20, 1946.  L. E. JONES  2,405,957
VARIABLE SPEED TRANSMISSION
Filed May 27, 1944  3 Sheets-Sheet 1

INVENTOR.
LLOYD E. JONES
BY
John W. Michael
ATTORNEY.

Aug. 20, 1946.　　　　L. E. JONES　　　　2,405,957
VARIABLE SPEED TRANSMISSION
Filed May 27, 1944　　　　3 Sheets-Sheet 2
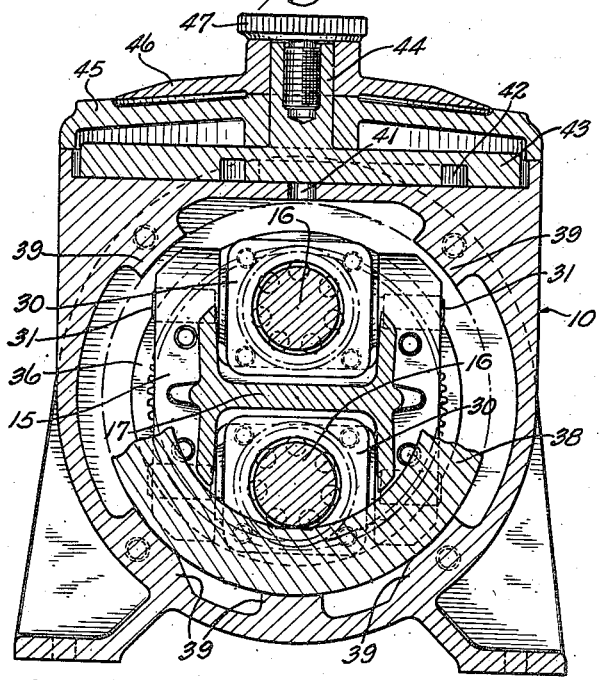
Fig. 3.
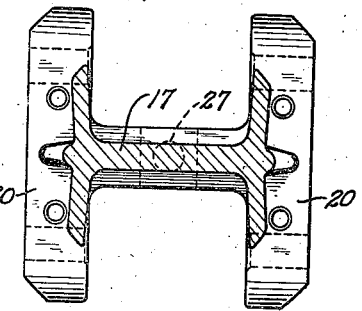
Fig. 6.
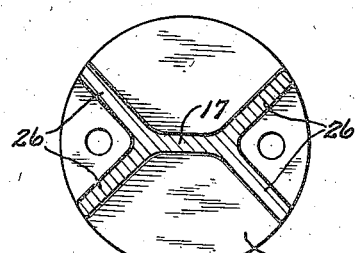
Fig. 7.
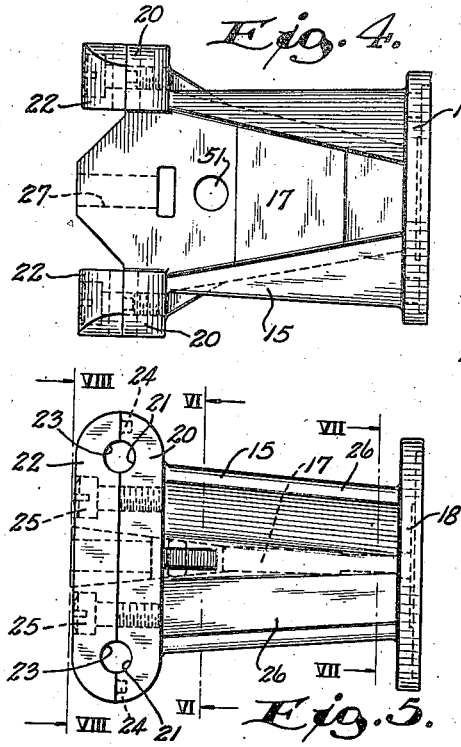
Fig. 4.
Fig. 5.
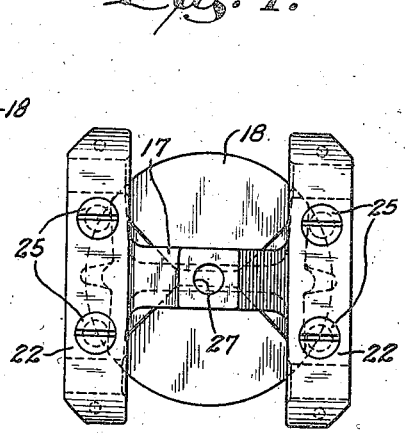
Fig. 8.
INVENTOR.
LLOYD E. JONES.
BY John W. Michael
ATTORNEY.

Aug. 20, 1946.                L. E. JONES                2,405,957
                       VARIABLE SPEED TRANSMISSION
                         Filed May 27, 1944         3 Sheets-Sheet 3

INVENTOR.
LLOYD E. JONES.
BY John W. Michael
ATTORNEY.

Patented Aug. 20, 1946

2,405,957

UNITED STATES PATENT OFFICE 2,405,957

VARIABLE-SPEED TRANSMISSION

Lloyd E. Jones, Milwaukee, Wis., assignor to Graham Transmissions, Inc., Milwaukee, Wis., a corporation of Delaware Application May 27, 1944, Serial No. 537,627

13 Claims. (Cl. 74—281)

This invention relates to improvements in variable speed transmissions of the type which employ a group or assembly of inclined longitudinally tapered planetary rollers intermediate the drive and driven shafts and a non-rotatable encircling contact ring adjustable lengthwise of the rollers to regulate their planetary action and thus vary the speed and the direction of rotation of the driven shaft, the rollers being fulcrumed at their small ends and in the operation of the transmission constrained to radial movement only when angularly displaced under the influence of centrifugal force or spring pressure or both in making contact with said ring.

Transmissions of this character are well known in the art. In order to insure radial freedom of motion of the rollers in these prior devices, the rollers were mounted at their small ends in bearings or fulcrum supports, usually in the form of spherical or self-aligning bearings or universal joints or the like, which permitted of universality of motion, and then by providing an additional bearing at the large end of each roller slidable in a radial slot in the carrier or otherwise restrained against lateral displacement all movement of the roller about its fulcrum point was confined to a radial plane. Patents to Gibson 1,887,505 dated November 15, 1932; Madle 2,315,067 dated March 30, 1943; and Graham 2,319,319 dated May 18, 1943, disclose examples of variable transmissions of the character referred to.

Many complications and difficulties have been attendant upon the manufacture and use of these prior transmissions due chiefly to the high degree of accuracy required in the manufacture and assembly of a device so constructed. Fulcrum supports such as heretofore used are costly and difficult to produce and if not made with extreme accuracy give rise to all sorts of trouble. Then too by reason of the use of two bearings for each roller it was necessary to bore the carrier at an incline at the small end of the roller and then make certain that the slot or other means at the other end of the carrier for confining the bearing or bearing block at that end to angular displacement in a radial plane was absolutely central of that bore. Furthermore, the fulcrum point or center of each inclined bore had to be so selected as to bring the outer surfaces of the rollers parallel with the central axis at the point where the lateral extremities of the rollers defined a circle equal to the bore of the ring. If this accuracy was not obtained and the roller action was then not coplanar with the central axis it would give rise to radial misalignment creating noise, heat, loss and so-called "fight" between the bearings at the two ends of the rollers.

I have discovered that a greatly simplified and highly successful transmission of the character referred to may be produced by supporting each roller in the carrier at one end only, preferably its small end, in a support of simple construction, easily produced, assembled and installed and which will both mount the roller for rotation with and with respect to the carrier and at the same time confine its freedom of motion to a radial plane.

It is therefore the chief object of the present invention to simplify and compact the construction of variable speed transmissions of the character referred to by reducing and simplifying the number of parts required, eliminating special bearings, universal joints and the like, and eliminating the bearing at the free or large end of the roller, thereby facilitating production and assembly of the device, reducing the cost thereof, and substantially increasing its capacity.

A further object of the invention resides in the provision of an improved fulcrum support for the rollers of a variable speed transmission of the character described which will permit of roller angular displacement in a radial plane only and confine it to such plane without the aid of a second bearing or other support.

Briefly described, that phase of the present invention having to do with the mounting of the rollers contemplates the journalling of the small end of each roller in a bearing or bearings mounted in a block pivoted or hinged on the carrier on an axis at right angles to the common plane of the axes of rotation of the roller and carrier; this mounting at but one end of the roller providing all of the required support for the roller, both radial and tangential, and constraining all angular displacement thereof to a radial plane.

A hinged or pivoted roller support is shown in Jepson Patent 2,178,395, but in that construction the hinge supports a stub shaft on which the roller is rotatably mounted. Two bearings are required, one for each end of the roller, and there is the added drawback of requiring the planetary gear associated with the roller to be located at the large end of the latter or remote from the pivot, all of which introduces complications in production and assembly and lays the basis for inaccuracies detrimental to smoothness and efficiency in operation.

Another object of the invention is to provide improved and simplified means for shifting the control ring lengthwise of the rollers in transmissions of the type referred to.

Another object of the invention resides in the provision of a mounting for each of the rollers in a planetary transmission of the character described which will free the roller for and limit it to angular displacement in a radial plane while incorporating adequate bearing support for all loads imposed upon the roller both radial and tangential.

A further object resides in the provision of new and novel means of spring loading the rollers in cases where loading in addition to that realized from centrifugal force alone may be desirable.

A still further object of the invention is to simplify, compact and improve throughout, the construction of a machine of this character, lower its costs, and enhance its capacity and efficiency and its adaptability for long life and diverse application.

Further objects and advantages reside in certain novel features of construction, arrangement and combination of parts which will be hereinafter more fully disclosed and particularly pointed out in the appended claims, reference being had to the accompanying drawings forming a part of this specification, and in which:

Fig. 3 is a transverse sectional view on the line III—III of Fig. 2, the upper portion of the control ring being broken away to better illustrate the relationship of the parts;

Fig. 4 is a top plan view of the roller carrier;

Fig. 5 is a side elevational view of the roller carrier;

Figs. 6 and 7 are transverse sectional views of the carrier taken on lines VI—VI and VII—VII, respectively, of Fig. 5;

Fig. 8 is a front elevation of the end of the carrier in which the rollers are mounted;

Figure 1:
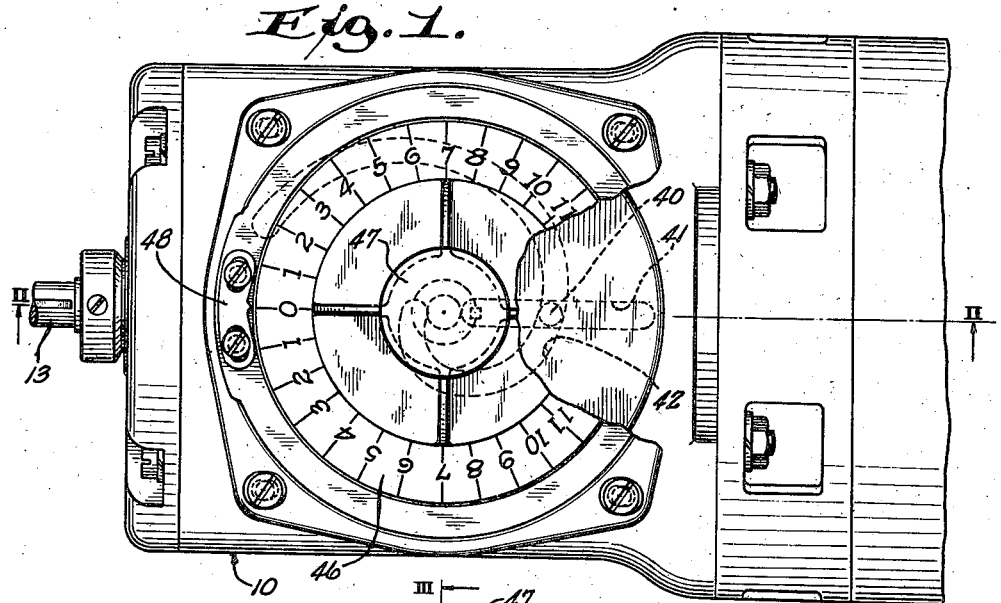
Fig. 1 is a top plan view of a variable speed transmission embodying the present invention with an electric motor connected thereto at one end, the motor being shown broken away.

The variable speed transmission enclosed in a suitable housing 10 includes a drive shaft 11 journalled in a bearing 12 in one end of the housing. A driven shaft 13 aligned with the drive shaft 11 is journalled in a bearing 14 at the opposite end of the housing 10. Coaxially associated with the drive and driven shafts and interposed therebetween is a carrier 15 for the planetary rollers 16. A set of two such rollers is shown in the drawings. More may be employed if desired and in some instances one such roller may suffice.

The carrier 15 (Figs. 2 and 4 through 8, inclusive) comprises a central web 17 provided at one end with a disk-like head 18 which is rigidly secured to the head 19 fixed to the end of the drive shaft 11. The web 17 at opposite sides of its other end is provided with outboard bearing bars 20, each provided with two semi-cylindrical bearings 21 and a removable retainer cap 22 provided with complementary semi-cylindrical bearings 23. Each bearing bar and its retainer cap may conveniently be provided with interfitting centering pins and sockets 24 and any suitable means such as cap screws or the like 25 may be employed to removably fasten the retainer caps in operative position. The web 17 of the carrier along each side edge thereof is provided with a pair of divergent flanges 26 which extend between the head 18 and the bearing bars 20, reenforcing the same and providing rigidity to the carrier as a whole. These flanges 26 also form elongated pockets for the reception of the rollers 16. The web 17 intermediate the bearing bars is gradually thickened in the direction of the driven shaft and provided with a central bore 27 into which there is press-fitted a pilot bearing pin 28. The protruding end of this pilot bearing pin 28 is journalled in a pilot bearing 29 mounted in a counter-bore in the inner end of the driven shaft 13.

In this manner the axes of the drive shaft, the carrier, and the driven shaft are maintained in true alignment, the carrier rotating with and at the same speed as the drive shaft, while the shaft 13 may be driven at differential speeds in either direction through the planetary transmission mechanism in the manner characteristic of this type of device as hereinafter described.

As more clearly shown in Fig. 8, the outboard bearing end of the carrier in front elevation takes the configuration of the letter H, the outboard bearing bars 20 forming the legs of the H and the bore end of the web 17 the cross arm. This in effect provides two cradles between the bars 20, one on each side of the web 17. Each cradle accommodates a bearing block 30 provided with trunnions or pivot pins 31 journalled in the outboard bearings 21—23 of the carrier. Each bearing block houses preferably two standard type ball bearings 32 and 33 or a single double row type ball bearing, with the races in either case disposed adjacent one to the other on opposite sides of the pivotal axis of the block. The bearings are preferably centered in the blocks and retained therein by flanges 30a and 30b, one of which is desirably removably attached to the block by screws or other suitable means for convenience in assembling and repairing. Each roller at its small end is provided with a journal 34 which extends through the bearing 32—33 to mount the roller for rotation with and with respect to the carrier. Each journal 34 extends beyond the carrier adjacent the block 30 and has keyed thereto a pinion 35 in mesh with the ring gear 36 fixed upon the enlarged hub 37 of the driven shaft 13. The enlarged tapered portions of the rollers are disposed within the elongated pockets of the carrier formed by the web 17 and flanges 26 thereof as shown more clearly in Fig. 2.

The pivotal axes of the blocks 30 in the carrier are so located that when the rollers swing outwardly into contact with the control ring 38 the outer lateral extremities thereof are substantially parallel to the axis of the carrier. The control ring 38 is supported, centered and guided in its movements lengthwise of the rollers by longitudinal ribs or lands 39 formed at intervals on the inner wall of the housing (see Fig. 3). The control ring 38 is held against rotation by providing the same with a pin or follower 40 which projects upwardly through an elongated slot 41 in the top wall of the housing. In practice the transmission mechanism runs in oil.

The control ring is moved lengthwise of the rollers to vary the speed of the driven shaft through engagement of follower 40 in cam groove 42 formed in the underside of the disk 43. The disk is preferably provided with a stem 44 journalled in and through the cover plate 45 secured to the top wall of the housing 10. Above the cover plate 45 a graduated dial 46 is keyed to the stem 44 and thus provides means for rotating the cam disk to adjust the control ring 38 longitudinally of the rollers in either direction to vary the planetary action thereof and thus the speed and direction of rotation of the driven shaft. The hub portion of the dial 46 rests on the cover plate 45 and at its upper end projects slightly above the upper end of the stem 44 and a knurl-headed screw 47 is threaded into the upper end of the stem, the head overhanging and engaging down upon the end of the dial hub so as to clamp and hold the dial and disk against the cover plate in any of the various positions of adjustment. An indicator or pointer 48 is mounted on the cover plate 45 adjacent the dial. The cover plate 45 and the indicator 48 are adjustably secured in position by means of screws and elongated slots as shown. Thus the indicator or pointer 48 may be adjusted for the zero setting of the dial, while further adjustment may be made by shifting the entire cover plate 45, as permitted by the elongated slots, to insure the proper reading of speeds forward, or forward and reverse, as the case may be.

From the foregoing it will be observed that a variable speed transmission of the character described has been produced which is extremely simple and compact in its construction and efficient and dependable in its operation. The radial or outward load of each roller arising from centrifugal force is divided between and fully supported by the bearing at the fulcrum mounting at the small end of the roller and by the control ring at the other, the ring fulfilling the identical function in so far as supporting the outward load is concerned, as the fixed outer race of a roller bearing, the tapered planetary rollers being the counterpart of the rollers in such bearing.

Obviously the bearing placed at the large end of the roller as in all previous constructions of this character carries none of the radial load since such bearing has radial freedom, its function being to locate the roller axis in the same plane as the transmission axis and to take part of the tangential or tractional load imposed by the control ring on the roller. It so happens that this tangential load in any friction drive running in oil is but a very small fraction of the radial load and in the present invention this tangential load is materially reduced in value and, in fact, rendered substantially negligible by providing bearing support for the roller at its small end only, for, as can be demonstrated, the centrifugal and gyroscopic forces acting on the roller tend, if unhindered, to set the roller axis coplanar with the rotor axis so that by eliminating bearing restraint at the large end of the roller the latter is free to take a truly radial position under the influence of these forces. Thus both radial and tangential loads are adequately carried at the fulcrum point and the roller is more easily and accurately located than with bearings at both ends. And too, these advantages are achieved without necessitating any increase in the size of the fulcrum support over that of those heretofore employed which carried the radial load only. Furthermore, not only are the bearings at the large end of the roller dispensed with entirely but a greater relative length of working roller surface (in a given length of transmission) is made available for traction, increasing by about one-third the horsepower capacity of the transmission. The extreme simplicity of the bearing block-carrier assembly is of great importance and advantage. All that is required is to provide one or more cradles or the like in the carrier, drill or otherwise form a pair of aligned, straight, cylindrical openings in the side walls thereof in a plane at right angles to the longitudinal axis of the carrier and then mount the bearing block trunnions or pivot pins therein, extremely simple operations and procedure from a manufacturing standpoint, particularly as compared with the precision requirements and complications attendant upon the manufacture of this type of variable speed transmission as heretofore constructed.

Figure 2:
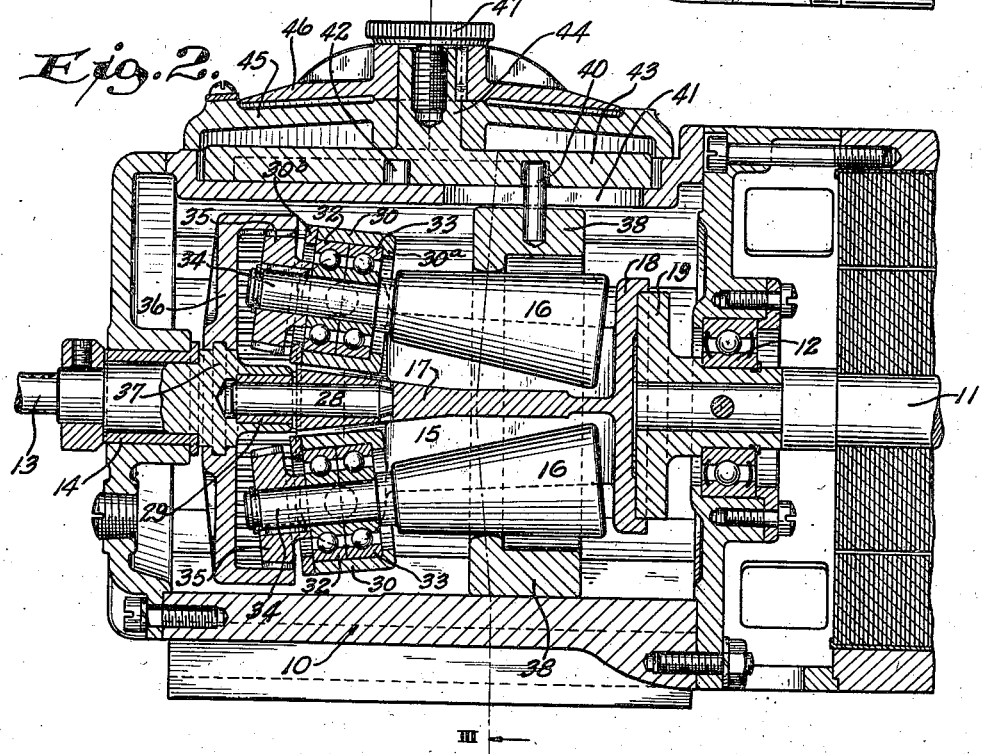
Fig. 2 is a longitudinal sectional view on the line II—II of Fig. 1.
Figure 9:
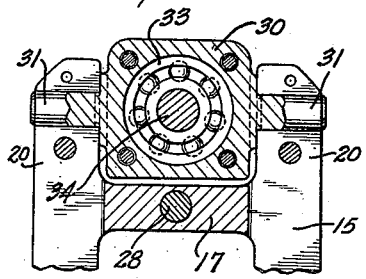
Fig. 9 is a sectional view taken on the face plane of the outboard bearing bars of the carrier showing the planetary roller bearing and the mounting thereof in the carrier.
Figure 10:
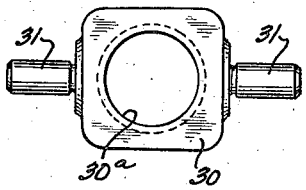
Figs. 10 and 11 are rear and front elevations, respectively, of the block for mounting the planetary roller bearing in the carrier.
Figure 11:
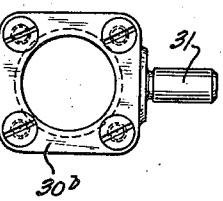

An important further advantage derives from the mounting of each of the planetary rollers according to the present invention in dual bearings in the pivotal block, one on either side of the fulcrum axis thereof (Fig. 2) or in a single bearing of the roller type with the bearing rollers extending on both sides of said axis (Fig. 12), so as to insure that all radial and tangential load imposed upon the planetary roller is equally divided between the dual bearings (Fig. 2) or over the full length of the rollers of a roller bearing (Fig. 12), a feature not found in previous constructions of this character. Anti-friction bearings of the ball type are preferred and may take the form of two separate single row bearings as shown in Fig. 2, or a single double row bearing with one row disposed on either side of the pivotal axis. The invention, however, is not limited to the use of such bearings as, obviously, various other types and constructions of bearings may be employed in association with the bearing blocks for the mounting of the planetary rollers.

Figure 12:
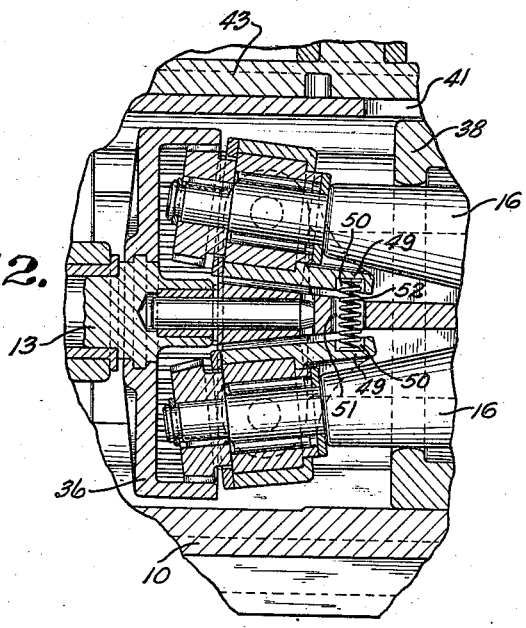
Fig. 12 is a fragmentary sectional view showing a modified form of the invention and illustrating a novel construction and arrangement for the incorporation of supplementary spring loading in a device of the character described.
Figure 13:
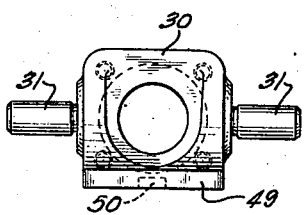
Figs. 13 and 14 are rear and side elevations, respectively, of the modified bearing block employed when incorporating supplementary spring loading.
Figure 14:
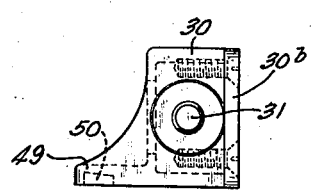

In the operation of the transmission centrifugal force will urge the rollers 16 outwardly about the pivotal mountings of the bearing blocks into pressure contact with the control ring which in turn regulates their planetary action to thus vary the speed and the direction of rotation of the driven shaft. In many adaptations of the transmission centrifugal force alone may be relied upon to develop sufficient working pressure between the rollers and the ring, but in some instances it is desirable to supplement the action of such force by the employment of additional loading means which while available in a number of ways is most conveniently incorporated by the use of a spring. The mounting of the rollers as herein provided renders possible the incorporation of supplementary spring loading in a very simple, direct and effective manner. This is also illustrated in Fig. 12 wherein the bearing blocks are shown provided with forwardly projecting lever arms in the form of reenforced flanges 49 provided with opposed recessed seats 50 aligned with each other and with an aperture 51 in the web 17 of the carrier. A coiled or compression spring 52 is interposed between the flanges 49 seating at its opposite ends in the seats 50 and extending through the aperture 51 and acting directly upon the lever arms to tilt the bearing blocks about their pivots in such wise as to force the rollers apart and thus supplement the centrifugal force in the movement of the rollers outwardly about their fulcrums into pressure contact with the control ring. It will be understood, of course, that the spring loading feature shown in Fig. 12 may be employed with equal facility in the preferred construction shown in Fig. 2 of the drawings.

A variable speed transmission constructed as herein described may be conveniently manufactured at a low cost. The device is capable of a wide variety of applications. It is readily controlled, quiet and efficient in operation, and renders available a wide range of speeds, in both forward and reverse. And yet, the structure is extremely simple and highly compact. It may be applied with equal effectiveness to a built-in motor, coupled motor or other type of drive, and can be readily combined with reduction or step-up gearing which may be conveniently incorporated at the output end of the unit. It will also be appreciated that the size of the gears of the transmission may be varied as desired so as to give, for instance, in some applications, speeds from maximum to zero, and in other cases approximately equal speeds on both sides of zero.

Various changes may be made in the embodiment of the invention hereinabove specifically described without departing from or sacrificing the advantages of the invention as defined in the appended claims.

I claim:

1. In a variable speed transmission, the combination of a rotary carrier, an axially movable control ring, an inclined tapered planetary roller mounted adjacent one end thereof in a bearing hinged to said carrier on a radially fixed axis, said roller being rotatable in said bearing with and with respect to said carrier and swingable on said hinge into contact with said ring, the swinging movements of said roller being constrained by said hinge to a radial plane.

2. In a variable speed transmission, the combination of a rotary carrier, an axially movable control ring, a bearing block pivotally mounted on said carrier, a bearing in said block, and a roller mounted in said bearing for rotation with and with respect to said carrier and for radial movement about the pivotal axis of said block into pressure engagement with said ring.

3. A variable speed transmission of the character described, comprising a rotary carrier, an axially movable control ring, a pair of inclined tapered planetary rollers, each of said rollers being hung at one end only from said carrier by means of a radially fixed bearing hinged to said carrier, and means interposed between said bearings for urging said rollers apart and into contact with said ring.

4. In a variable speed transmission, the combination of a rotor, a pair of inclined tapered planetary rollers each rotatably mounted at one end only in a bearing pivotally supported on said rotor, driving means, encircling means adjustable to regulate the speed ratio of the transmission, spring means interposed between said roller mounting means acting to induce pressure contact between said rollers and encircling means, and driven means responsive to the motion of said rollers.

5. In a variable speed transmission, the combination of a rotary carrier provided with a cradle disposed to one side of its longitudinal axis, a bearing block pivoted in said cradle, a bearing in said block, an inclined tapered planetary roller mounted adjacent one end thereof in said bearing, and a control ring encircling said roller and movable longitudinally thereof and in contact therewith to vary the speed transmitted.

6. In a variable speed transmission, a rotary carrier, a plurality of rollers rotatable with the carrier, bearing blocks pivotally mounted on the carrier, bearings mounted in the blocks and supporting the rollers for rotation with and with respect to the carrier, the rollers being rockable radially outwardly on the bearing block pivots under the action of centrifugal force, and a control ring encircling and movable along the rollers and in contact therewith to vary the speed transmitted.

7. In a variable speed transmission of the planetary type, a rotary carrier, a plurality of bearings pivotally mounted on the carrier, rollers severally mounted in the bearings for rotation with and with respect to the carrier and for movement radially thereof, resilient means biasing the bearings for tilting about the pivotal axes thereof to urge the rollers outwardly, and a control ring encircling the rollers and movable therealong and in contact therewith to vary the speed transmitted.

8. In a variable speed transmission, the combination of a rotary carrier, an axially movable control ring, a pair of planetary rollers, bearing blocks pivotally mounted in said carrier and supporting said rollers for rotation with and angular displacement and rotation with respect to the carrier, and spring means positioned transversely of the carrier at right angles to the longitudinal axis thereof between and in engagement with said blocks for inducing pressure contact between said rollers and ring.

9. In a variable speed transmission, the combination of a rotary carrier, an axially movable control ring, a planetary roller, and a bearing block pivotally mounted in said carrier and supporting the roller for rotation with and angular displacement and rotation with respect to the carrier, said roller having bearing support in said block on both sides of the pivotal axis thereof.

10. In a variable speed transmission, the combination of a rotary carrier provided with a cradle on each side of and spaced equidistantly from the axis of rotation of the carrier, a pair of aligned openings in the carrier at opposite sides of each of the cradles, a bearing retainer member in each cradle provided with trunnions mounted in said openings, a rotary bearing in each of said retainers disposed on an axis at right angles to the trunnion axis of its supporting retainer, an inclined tapered planetary roller mounted adjacent one end thereof in each of said bearings, and a control ring encircling said rollers and movable longitudinally thereof and in contact therewith to vary the speed transmitted.

11. In a variable speed transmission, the combination of a rotary carrier provided with a radially offset cradle having pivot holes in the side walls thereof, a bearing block pivoted in said holes, a bearing carried by said block, a planetary roller mounted adjacent one end thereof in said bearing, and a control ring encircling the roller and movable longitudinally thereof and in contact therewith to vary the speed transmitted.

12. The combination with the axially movable control ring of a planetary roller type of variable speed transmission, of means for holding said ring against rotation in and during all axial adjustments thereof, cam means coacting with said first named means for effecting adjustments of said ring, said second named means comprising a rotary disk provided with a cam groove and said first named means comprising a follower fixed to said ring and projecting through a slot in the housing of the transmission into said groove, a dial for actuating said disk, a cover plate for said disk interposed between the latter and said dial, and means for making the dial and disk fast to the cover plate for holding the ring and dial reading in any position of adjustment.

13. In a variable speed transmission, the combination of a rotary carrier, an axially movable control ring, an inclined tapered planetary roller disposed within said ring and supported at one end only upon said carrier and being free of said carrier at its other end, a bearing block movably mounted on said carrier for supporting said roller thereon, and a bearing in said block for mounting said roller for rotation with and with respect to the carrier, said roller by virtue of the freedom of movement of said block with respect to said carrier being capable of movement outwardly of the carrier axis into pressure engagement with said ring.

LLOYD E. JONES.